Sept. 2, 1924. 1,506,866
M. ROUX
FLUID COMPASS
Filed Jan. 31. 1921
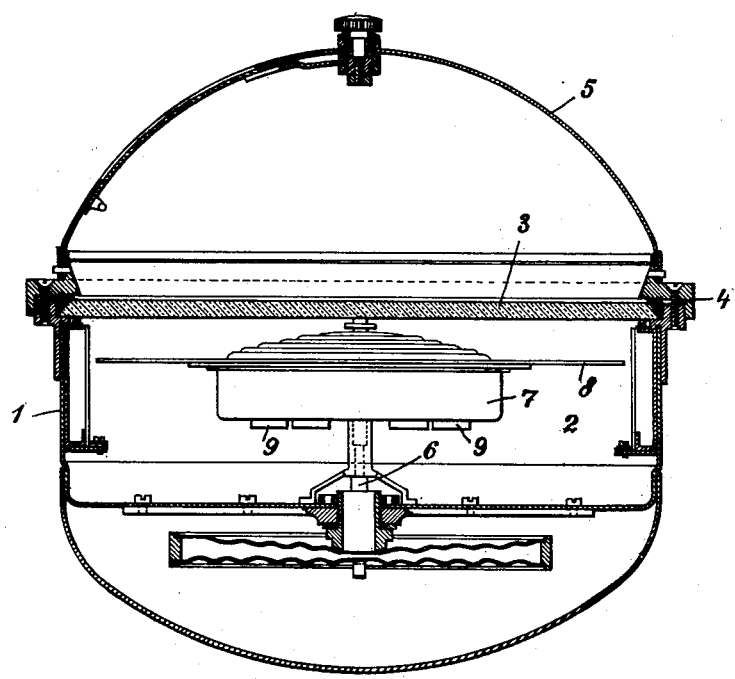
Inventor:
Max Roux.

Patented Sept. 2, 1924.

1,506,866

UNITED STATES PATENT OFFICE.

MAX ROUX, OF BERLIN-FRIEDENAU, GERMANY.

FLUID COMPASS.

Application filed January 31, 1921. Serial No. 441,519.

(GRANTED UNDER THE PROVISIONS OF THE ACT OF MARCH 3, 1921, 41 STAT. L., 1313.)

*To all whom it may concern:*

Be it known that I, MAX ROUX, a citizen of the Republic of Germany, residing at Berlin-Friedenau, Republic of Prussia, Germany, have invented certain new and useful Improvements in Fluid Compasses, for which I have filed application in Germany May 24, 1918, Patent No. 312,387; in Sweden Jan. 24, 1919, Patent No. 47,301; in Austria Jan. 24, 1919; in Norway Feb. 28, 1919, Patent No. 30,406; in France Feb. 3, 1919, and in Great Britain July 7, 1919, and of which the following is a specification.

Fluid compasses, which are usually employed in airships and aircraft, are filled, as is well known with a liquid consisting of water and alcohol. It is a well-known phenomenon that this liquid, when the airship or aircraft attains a considerable altitude, begins to "boil" and that shortly afterward the inspection-glass of the compass becomes coated with frost. So far it is unknown to what reason this phenomenon must actually be attributed. As a rule it has been put down to the great cold which prevails at considerable altitudes, and, for that reason, it has been proposed to heat the compass as soon as great heights have been attained. As a matter of fact, this has been attended by very favourable results. But the heating means then also to be carried by the aerial vessel are an undesirable increase of the load.

Now, my investigations and experiments have revealed the fact that the coldness in the higher altitudes is only of secondary importance, whereas the primary cause resides in the low air pressure in those altitudes. The liquid filled in at normal atmospheric pressure contains a certain amount of air which gets separated from the liquid in regions where the pressure is lower, as in the altitudes in question. The liquid then "boils".

It is obvious that, under the before-mentioned circumstances, the inner surface of the sight glass of the compass gets covered with damp or vapor, or liquid respectively, when the aerial vessel arrives in the altitudes in question, and as besides the air-pressure, also the temperature is low in the respective regions, the inner surface of the sight-glass is soon frozen over.

When by such exhaustive investigations the actual causes of the phenomenon under consideration had been determined I found that it was relatively easy to entirely abolish the occurrence of these phenomena without its being necessary to have recourse to the undesirable heating device already known. It has, merely been found necessary to remove the air as completely as possible from the liquid to be filled into the compass so that even when the compass passes into regions where it is subjected to low pressure such as is the case at great altitudes, the separation of air and gases from the liquid can no longer take place. The de-aerating of the liquid can either take place by bringing the normally filled compass kettle into a chamber in which a vacuum has been created or place it in communication with such a chamber and thus artificially compel the gas bubbles to be separated off, which separation has hitherto not taken place till great altitudes have been attained. The liquid can, however, be also de-aerated previously and then filled into the compass kettle in vacuo. This can, for instance, be effected in such manner that water and alcohol are evaporated either separately or in common whereupon the condensate is allowed to flow into the compass kettle into a chamber in which a vacuum has been created. In both cases a completely de-aerated liquid is obtained in the compass kettle which no longer throws off any gas bubbles irrespective of any conditions of pressure that may come into consideration, in practical use. Experiments have shown that a compass filled with such de-aerated liquid no longer shows the greatly feared "boiling" of the liquid even at the greatest altitudes that an airship or aircraft can attain, whilst the frosting of the inspection glass also no longer takes place because the causes of the latter phenomenon are done away with.

In connection with the above, attention must be paid to the fact that, as regards dry compasses intended for marine purposes, it has already been proposed to evacuate the compass kettle and close it up hermetically in order to prevent air saturated with moisture from getting access into the interior of the kettle, as the rotary motion of the compass-card would be noxiously affected thereby. Clearly this proposal has nothing at all in common with the characteristic feature of the present invention as, the aims and objects are fundamentally different. The present invention is concerned solely with fluid compasses which are used in aircraft and especially for ascents to great altitudes and provides means to prevent gases arising from the liquid when such altitudes are attained whereby, at the same time, the clouding and freezing over of the inspection glass is rendered impossible.

The clouding of the liquid, hitherto arising from pulverized or detached particles of varnish, can also be avoided provided the varnishing be applied under similar conditions, namely, in vacuo. The chipping of the varnish is also solely due to the fact that the varnish under normal atmospheric conditions contains air which, under such reduced pressure as is encountered at a great altitude expands and thus induces the bursting or blistering of the coating. Consequently if a de-aerated varnish be used then the drawbacks referred to must also be avoided. This is again realized by the fact that the varnish prepared in vacuo is also applied in vacuo to the inner surface of the compass kettle or binnacle.

This may be effected with aid of a transparent vessel which is adapted to receive the compass kettle or binnacle and has an airtight cover provided with a stuffing-box by which the handle of a brush is packed. This stuffing box is so constructed that the handle may not only be axially displaced in it, but may also be inclined to all sides for a sufficient degree, and the shape of the brush proper is such that it can contact with the whole of the surface to be varnished.

I am aware of the fact that liquid has already been deaerated by subjecting it to a vacuum, but I do not claim this deaerating method broadly, but its employment in connection with a compass, or, in other words, the employment of a deaerated liquid in a compass that is intended for an aerial vessel or the like and gets into high or comparatively high altitudes where the air pressure is considerably below the normal one, at least in such a measure that the disturbing phenomenon mentioned in the first part of this specification arises. It is a novel cognisance on my part that this phenomenon is due to the effect of the reduced air pressure in the higher altitudes upon the non-deaerated liquid and the non-deaerated varnish, and I have overcome the hurtful effects by making use of deaerated liquid, as described.

My invention is illustrated by way of example in the accompanying drawing on which is shown a vertical section through a compass-kettle having a deaerated liquid as compass fluid in conformity with this invention.

In this figure 1 is the compass kettle, the interior space 2 of which is closed at its top by a glass plate 3 which may be provided with an india-rubber ring 4 forming a packing between the rim of the glass plate and the adjacent surface of the compass kettle, and, besides, a cover 5 may be provided above the glass plate to protect it. The compass card is carried by a float 7 held centrally by a pin 6 and provided at its bottom with magnets 9. The other parts also shown are immaterial for the invention and I abstain therefore from entering into details as regards them.

This compass contains, or, more precisely, all compasses of this kind contain, in the space or chamber 2 a liquid consisting generally of a mixture of water and alcohol. According to this invention, the liquid or the mixture is intentionally deaerated. This may be effected in several ways, for instance by deaerating the liquid or mixture outside the compass-kettle 1 and introducing it therein into deaerated state, which takes place in vacuo, also the glass plate being mounted, fastened and packed, in vacuo, or by introducing into the kettle 1, or the chamber 3 thereof respectively, a non-deaerated liquid and placing the kettle with this liquid into a space connected with an air pump by which the air is contained in that space, the kettle, and the liquid, is removed to the highest attainable degree. Mounting, fastening, and packing, the glass plate is effected, of course, also in this case in vacuo.

I claim:—

1. In a fluid compass for use in connection with an aerial vessel or the like, the combination, with the kettle or binnacle of the compass, of a deaerated liquid as compass fluid, for the purpose as described.

2. As a new article of manufacture, a fluid compass having hermetically closed kettle or binnacle containing a deaerated liquid as the compass fluid, substantially as described.

In testimony whereof I have affixed my signature in presence of two witnesses.

MAX ROUX.

Witnesses:
OTTO E. ZOEPKE,
ROSO STAHL.